United States Patent [19]

Thomas

[11] 4,102,837

[45] Jul. 25, 1978

[54] UNSATURATED POLYESTER RESIN COMPOSITION COMPRISING POLYPROPYLENE ADIPATE

[75] Inventor: David Hamilton Thomas, Middlesbrough, England

[73] Assignee: Imperial Chemical Industries Limited, Great Britain

[21] Appl. No.: 799,160

[22] Filed: May 23, 1977

[30] Foreign Application Priority Data

Jun. 3, 1976 [GB] United Kingdom ............... 22952/76
Sep. 14, 1976 [GB] United Kingdom ............... 38003/76

[51] Int. Cl.$^2$ ...................... C08G 63/46; C08G 63/52; C08L 91/06
[52] U.S. Cl. .............................. 260/22 CB; 260/28 R; 260/31.2 XA; 260/40 R; 260/861; 428/431
[58] Field of Search .......... 260/22 CB, 861, 31.2 XA, 260/28, 40 R; 428/431

[56] References Cited

U.S. PATENT DOCUMENTS

| | | | |
|---|---|---|---|
| 2,861,910 | 11/1958 | Johnston et al. ...................... | 428/431 |
| 2,957,837 | 10/1960 | Smith et al. .................. | 260/31.2 XA |
| 3,334,008 | 8/1967 | Park et al. ............................ | 428/430 |
| 3,700,546 | 10/1972 | Terenzi ................................ | 428/431 |
| 3,909,483 | 9/1975 | Hindersinn et al. ................. | 260/861 |
| 3,922,247 | 11/1975 | Hazen et al. ......................... | 260/861 |
| 3,923,927 | 12/1975 | Miyake et al. ....................... | 260/861 |
| 3,933,875 | 1/1976 | Brose et al. .......................... | 260/861 |
| 3,959,209 | 5/1976 | Lake .................................... | 260/861 |
| 3,969,560 | 7/1976 | Lewis et al. ......................... | 260/861 |

FOREIGN PATENT DOCUMENTS

| | | | |
|---|---|---|---|
| 48-12,063 | 4/1973 | Japan .................................... | 428/430 |
| 937,703 | 9/1963 | United Kingdom. | |
| 1,098,132 | 1/1968 | United Kingdom. | |

OTHER PUBLICATIONS

Boenig–Unsaturated Polyesters; Structure and Properties, Elsevier Publishing Co., Amsterdam, 1964, pp. 59–77.

*Primary Examiner*—Ronald W. Griffin
*Attorney, Agent, or Firm*—Cushman, Darby & Cushman

[57] ABSTRACT

An ethylenically unsaturated polyester resin composition which comprises an ethylenically unsaturated polyester, an ethylenically unsaturated monomer copolymerizable therewith and a plasticizer, particularly a liquid saturated polyester and/or stearic acid, the ethylenically unsaturated polyester being derived in part from terephthalic acid.

8 Claims, 1 Drawing Figure

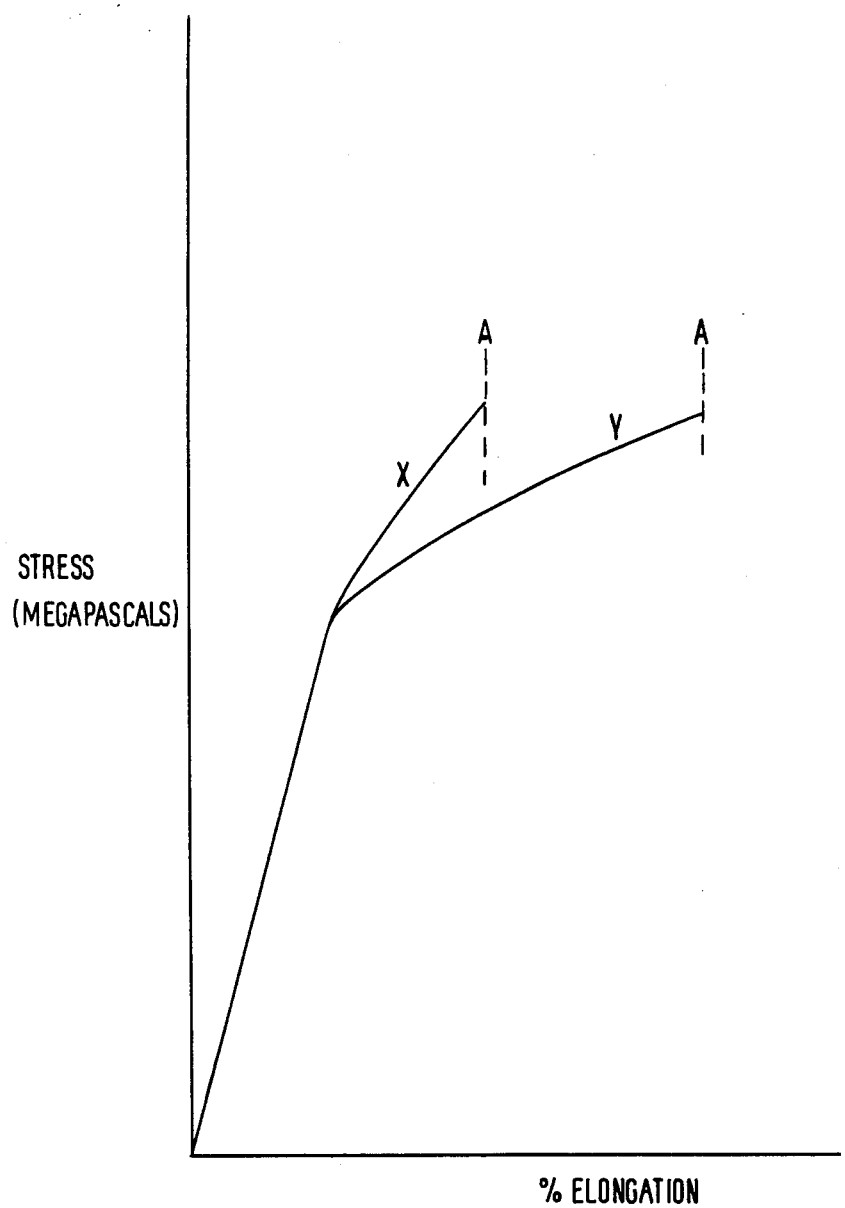

UNSATURATED POLYESTER RESIN COMPOSITION COMPRISING POLYPROPYLENE ADIPATE

The present invention relates to a resin composition, in particular to an unsaturated polyester resin composition.

It is known to formulate unsaturated polyester resin compositions from an unsaturated polyester, an ethylenically unsaturated monomer copolymerisable therewith and a saturated polyester plasticiser whereby a casting or moulding composition is obtained which cures with a minimum of shrinkage. The unsaturated polyesters which are used in such compositions may be derived from an unsaturated dibasic acid such as maleic acid, a saturated polyol such as propylene glycol and, optionally, a saturated dibasic acid such as adipic acid or isophthalic acid. We have now found that when such unsaturated polyester resin compositions contain an unsaturated polyester which has been derived from terephthalic acid a product is obtained which has particular value as a sheet moulding composition.

According to the invention therefore an unsaturated polyester resin composition comprises an ethylenically unsaturated polyester, an ethylenically unsaturated monomer copolymerisable therewith and a plasticiser, the ethylenically unsaturated polyester being derived in part from terephthalic acid.

The ethylenically unsaturated polyester is derived from a polybasic acid and a polyol. The polybasic acid component comprises an ethylenically unsaturated polybasic acid, suitably containing up to 20 carbon atoms, e.g. maleic acid, fumaric acid, mesaconic acid, citraconic acid or itaconic acid; and terephthalic acid. The polybasic acid may optionally but less preferably include as well as terephthalic acid one or more other dibasic acids which are not ethylenically unsaturated and which suitably contain up to 20 carbon atoms, e.g. adipic, glutaric or succinic acid. The molar ratio of terephthalic acid to the unsaturated dibasic acid in the polybasic acid component of the unsaturated polyester is suitably in the range 1 : 10 to 3 : 1, preferably 1 : 5, to 1 : 1 and is more preferably 1 : 2 or 1 : 3.

The polyhydric alcohol component of the unsaturated polyester preferably contains up to 20 carbon atoms. It may be a glycol, e.g. mono-, di-, or tri-ethylene glycol, mono-, di-, or tri-propylene glycol, mono-, di- or tri-butylene glycol, neopentyl glycol or hexane diol. The polyhydric alcohol may contain more than two hydroxyl groups, e.g. glycerol or pentaerythritol but generally a glycol, particularly propylene glycol, is preferred.

The ethylenically unsaturated monomer which is copolymerisable with the ethylenically unsaturated polyester can be chosen from those compounds used for this purpose. Thus the monomer may be a vinyl-substituted aromatic or heterocyclic compound, e.g. styrene, alpha- methylstyrene, alpha-chlorostyrene, vinyltoluene, meta- or para-1,4-divinyl benzene or vinylpyrrolidone. The monomer may also be an ethylenically unsaturated ester, e.g. vinyl acetate, allyl acetate, diallyl-maleate, diallylphthalate, triallylcyanurate or a lower ($C_1$ to $C_6$) alkyl ester of acrylic or methacrylic acid. Alternative monomers which may be used include acrylonitrile or methacrylonitrile. The preferred copolymerisable monomer is styrene, the unsaturated polyester being generally soluble in this hydrocarbon.

The plasticiser which is used in the composition is suitably polymeric in nature and may be a low molecular weight (preferably less than 1,000) hydrocarbon, for example, a low molecular weight wax, preferably one containing 10 to 50 carbon atoms. Alternatively a low molecular weight hydrocarbon substituted by one or more functional groups, e.g. halogen, carboxyl, hydroxyl, amine or amide groups may be used. Examples of these substituted hydrocarbons include chlorinated hydrocarbon polymers, $C_{10}$ to $C_{30}$ carboxylic (particularly alkanoic) acids, alcohols, amines and amides such as stearic acid and stearyl alcohol. Preferably the plasticiser is a liquid saturated polyester, i.e. the reaction product of a polybasic acid and polyhydric alcohol and with a molecular weight preferably in the range 500 to 15,000 more preferably 500 to 7,000. The polybasic acid is usually dibasic and the polyhydric alcohol dihydric so that the resulting polyester is linear rather than cross-linked, so producing the desired liquid rather than solid polyester. The polybasic acids and polyhydric alcohols which form the polyester may have up to 20 carbon atoms, aliphatic acids and alcohols being preferred. Examples of suitable acids include adipic, succinic and glutaric acids while suitable alcohols include mono-, di-, and tri-ethylene glycol, mono-, di- and tri-propylene glycol, mono, di- and tri-butylene glycol, neopentyl glycol and hexane diol. Preferably the plasticiser is polypropylene adipate the polyester derived from propylene glycol and adipic acid. In some instances it is advantageous to use more than one plasticiser as the combination may be synergistic and have an unexpectedly beneficial effect on the properties of the unsaturated polyester resin composition and articles made therefrom. In particular, a low molecular weight hydrocarbon or substituted low molecular weight hydrocarbon such as stearic acid may be combined with a liquid saturated polyester such as polypropylene adipate.

The unsaturated polyester resin composition may contain 40 to 80% by weight of the ethylenically unsaturated polyester 20 to 50% by weight ethylenically unsaturated comonomer and 2 to 30% by weight plasticiser.

Sheet moulding compositions may be formed from the novel unsaturated resin compositions described above by incorporating fillers and a glass or similar fibre and by extruding through rollers in sheet form. Suitable fillers include chalk, silica, clay, slate and talc. The composition may also include other additives commonly used in unsaturated polyester resin compositions, e.g. pigments, lubricants, e.g. calcium stearate, and cure initiators, e.g. per-compounds such as peroxides and perbenzoates.

A typical sheet moulding composition contains 100 parts unsaturated polyester and copolymerisable monomer, 5 to 30 parts plasticiser, 50 to 150 parts filler and 25 to 75 parts of glass, other additives totalling up to 20 parts, all parts being by weight. We have found that a sheet moulding composition made in accordance with the invention has an increased percentage elongation as compared with a similar composition without the plasticiser. In addition the finally cured article shows improved corrosion resistance when compared with a similar article made from resin without the plasticiser. We have also found that analogous resins containing the plasticiser but replacing the terephthalic acid by conventional isophthalic acid do not show the same improvement in elongation properties or corrosion resistance.

Compositions according to the invention may also be used in "hand-lay-up" techniques in which a reinforcing agent such as glass fibre is coated by hand with an unsaturated polyester resin. The strength and strength retardation of the final produce made by such techniques may be increased up to 40% when a composition according to the invention containing a plasticiser such as stearic acid is used as compared with an equivalent composition without the plasticiser.

Compositions according to the invention also have advantages in moulding applications. Suitably reinforced in the form of a dough or a sheet they may be placed in a mould and squeezed to take the shape of the mould. In this use of the invention a sheet moulding composition need not line the mould but may be folded up and placed in the mould at random the pressure squeezing it into the shape of the mould to give a precisely shaped article of considerable strength.

The invention will now be further described with reference to the following Example.

EXAMPLE 1

An unsaturated polyester was made by esterifying 1 mole of a mixture of maleic anhydride and terephthalic acid with 1.1 mole propylene glycol, (the acids being present in a molar ratio of 2:1 maleic to terephthalic).

The unsaturated polyester was then dissolved in styrene to form a 68 weight % solution and 1.0 weight % methylethylketone peroxide and 0.15 weight % cobalt naphthenate added. Polypropylene adipate and/or stearic acid was then incorporated in the mixture which was coated on to chopped strand glass mat to form a hand lay-up composition (25 weight % glass) and the strength of the composition was measured using a Tensometer. The strength retention of the composition was also determined by boiling in water for 500 hours and then measuring the strength once more on the Tensometer, the strength retention being the ratio of the strength after boiling to before. The results for four different formulations were as follows:

| | Strength | Strength Retention |
|---|---|---|
| No additive | 540 units | $\frac{400}{540} = 0.74$ |
| 10% by wt. polypropylene adipate | 780 units | $\frac{450}{780} = 0.58$ |
| 1% by weight stearic acid | 650 units | $\frac{520}{650} = 0.80$ |
| 10% by weight polypropylene adipate + 1% by weight stearic acid | 700 units | $\frac{500}{700} = 0.71$ |

EXAMPLE 2

A composition was made up comprising:

| | |
|---|---|
| an unsaturated polyester* | 4.8 kilograms |
| styrene | 3.2 kilograms |
| polypropylene adipate | 800 grams |
| tertbutyl benzoate | 84 grams |
| calcium stearate | 80 grams |
| calcium carbonate | 8 kilograms |
| stearic acid | 80 grams |
| magnesium oxide | 160 grams |

*The unsaturated polyester was made by esterifying 1 mole of a mixture of maleic anhydride and terephthalic acid with 1.1 mole propylene glycol, (the acids being present in a molar ratio of 2:1 maleic to terephthalic).

The percent elongation of this composition was evaluated and compared with that of the composition without the polypropylene adipate. The result of the comparison is shown on the attached graph (curve Y representing the composition according to the invention, curve X the composition) in which it can be seen that the composition according to the invention has the greater percent elongation showing a region of plasticity before the break point A.

I claim:

1. An unsaturated polyester resin composition which comprises an ethylenically unsaturated polyester, an ethylenically unsaturated monomer copolymerisable therewith and polypropylene adipate, the ethylenically unsaturated polyester being made from a polyhydric alcohol containing up to 20 carbon atoms, terephthalic acid, and an ethylenically unsaturated polybasic acid containing up to 20 carbon atoms, the molar ratio of terephthalic acid to said polybasic acid being in the range 1:10 to 3:1.

2. An unsaturated polyester resin composition according to claim 1 in which the ethylenically unsaturated polyester includes as well as the terephthalic acid another non-ethylenically unsaturated dibasic acid containing up to 20 carbon atoms.

3. An unsaturated polyester resin composition according to claim 1 in which the ethylenically unsaturated monomer is a vinyl-substituted aromatic or heterocyclic compound, an ethylenically unsaturated ester, acrylonitrile or methacrylonitrile.

4. An unsaturated polyester resin composition according to claim 1 in which there is present, as a plasticiser, a low molecular weight hydrocarbon or a substituted low molecular weight hydrocarbon.

5. An unsaturated polyester resin composition according to claim 1 in which,
   (a) the ethylenically unsaturated polybasic acid is maleic acid, fumaric acid, mesaconic acid, citraconic acid or itaconic acid,
   (b) the polyhydric alcohol is mono-, di- or tri-ethylene glycol, mono-, di- or tri-propylene glycol, mono-, di- or tri-butylene glycol, neopentyl glycol, hexane diol, glycerol or pentaerythritol,
   (c) the ethylenically unsaturated monomer is styrene, alpha-methylstyrene, alpha-chlorostyrene, vinyltoluene, meta- or para-1,4-divinylbenzene, N-vinylpyrrolidone, vinyl acetate, allyl acetate, diallylmaleate, diallylphthalate, triallylcyanurate or a $C_1$ to $C_6$ alkyl ester of acrylic or methacrylic acid,
   (d) in which the composition contains 40 to 80% by weight of ethylenically unsaturated polyester, 20 to 50% by weight ethylenically unsaturated monomer and 2 to 30% by weight polypropylene adipate.

6. An unsaturated polyester resin composition according to claim 5 in which there is present, as a plasticiser, stearic acid.

7. An unsaturated polyester resin composition according to claim 5 including a plasticiser selected from the group consisting of a $C_{10}$ to $C_{50}$ wax or a chlorinated hydrocarbon polymer or a $C_{10}$ to $C_{30}$ carboxylic acid alcohol amine or amide.

8. A sheet moulding composition which comprises an unsaturated polyester resin composition according to claim 1 together with a filler and glass fibres.